United States Patent
Foss, Jr. et al.

(10) Patent No.: US 7,387,238 B2
(45) Date of Patent: Jun. 17, 2008

(54) CUSTOMER ENROLLMENT IN A STORED VALUE CARD PROGRAM

(76) Inventors: Sheldon H. Foss, Jr., 4125 River Glen Cir., Suwanee, GA (US) 30024; Dwight Harris, 50 Dover Cliff Way, Alpharetta, GA (US) 30022; Krishnamoorthy Srinvasan, 863 Muirfield Trail, Marietta, GA (US) 30068

( * ) Notice: Subject to any disclaimer, the term of this patent is extended or adjusted under 35 U.S.C. 154(b) by 199 days.

(21) Appl. No.: 11/139,211

(22) Filed: May 27, 2005
(Under 37 CFR 1.47)

(65) Prior Publication Data
US 2006/0163347 A1 Jul. 27, 2006

Related U.S. Application Data

(63) Continuation-in-part of application No. 10/685,277, filed on Oct. 14, 2003.

(51) Int. Cl.
*G06K 5/00* (2006.01)
(52) U.S. Cl. .......................................... 235/380; 705/35
(58) Field of Classification Search ................ 235/379, 235/380; 705/14, 26, 17, 40, 35
See application file for complete search history.

(56) References Cited

U.S. PATENT DOCUMENTS

| | | |
|---|---|---|
| 6,182,895 B1 | 2/2001 | Albrecht |
| 6,295,522 B1 | 9/2001 | Boesch |
| 2002/0083012 A1 | 6/2002 | Bush et al. |
| 2002/0143647 A1 | 10/2002 | Headings et al. |
| 2003/0212796 A1 | 11/2003 | Willard et al. |
| 2004/0030647 A1 | 2/2004 | Hansen et al. |
| 2004/0054587 A1 | 3/2004 | Dev et al. |
| 2004/0167821 A1 | 8/2004 | Baumgartner |
| 2004/0199422 A1 | 10/2004 | Napler et al. |
| 2005/0010483 A1 | 1/2005 | Ling |
| 2005/0038714 A1 | 2/2005 | Bonet et al. |
| 2005/0065877 A1 | 3/2005 | Cleary et al. |
| 2005/0127169 A1* | 6/2005 | Foss, Jr. ..................... 235/380 |
| 2005/0182720 A1 | 8/2005 | Willard et al. |
| 2005/0228717 A1* | 10/2005 | Gusler et al. ................. 705/14 |

OTHER PUBLICATIONS

"How do Wells Fargo® Check Cards work?" Internet article at https://www.wellsfargo.com/checkcard/manage/howitworks.*

* cited by examiner

*Primary Examiner*—Daniel A Hess
(74) *Attorney, Agent, or Firm*—Smith Frohwein Tempel Greenlee Blaha LLC

(57) ABSTRACT

Customer enrollment in a stored value card program is provided. One embodiment is a method for enrolling a customer in a stored value card program. One such method comprises: generating a list of unaffiliated stored value card programs; and when enrolling a new customer in a new stored value card program at a device, determining whether the new customer has a stored value account with one of the unaffiliated stored value card programs.

6 Claims, 13 Drawing Sheets

CUSTOMER ENROLLMENT IN A STORED VALUE CARD PROGRAM

CROSS-REFERENCE TO RELATED APPLICATIONS

This application is a continuation-in-part application of copending U.S. patent application Ser. No. 10/685,277, entitled "System, Method and Apparatus for Providing Financial Services," filed on Oct. 14, 2003, which is related to U.S. patent application Ser. No. 10/645,949, entitled "System for Providing a Checkless Checking Account," filed on Aug. 22, 2003 and U.S. patent application Ser. No. 10/646,150, entitled "System and Method for Dynamically Managing a Financial Account," filed on Aug. 22, 2003, all of which are incorporated by reference in their entirety.

BACKGROUND

Throughout the years, a main focus of providing services to consumers has been convenience. It is quite clear to even the most simplistic marketing analyst that the more convenient you can make a service to the consumer, the more likely the consumer will partake in the service. It is on this foundation that the majority of Internet services are based.

The Internet is not always the final answer in providing convenience to the consumer. In some instances, consumers are simply reluctant to conduct business over the Internet due to a variety of reasons, such as fear of losing confidentiality, resistance to relying on modern technology and sometimes, just stubbornness. Thus, there has been, is and remains a need in the art for providing face to face, plain old ordinary customer service.

The banking and credit industry is particularly poised in this predicament. Consumers that are engaging in financial transactions or receiving financial services often times prefer to deal with an institution rather than the Internet. Thus, marketers are still challenged with increasing the convenience at which such services are offered.

One avenue that has been extensively explored for providing financial services is through merchants. Consumers typically are willing to trust a merchant that is offering a financial service. This is evident in the fact that nearly every department store offers a credit program to their customers.

Typically, merchants are limited to the types of financial services that they can provide. This limitation can be due to a variety of factors including the cost that the merchant must incur to provide the service, the technological complexities of providing the service, and the training required for the merchant's employees. However, anyone that has completed a marketing 101 class will agree that the more services a merchant can offer, the more foot traffic the merchant will generate and, thus, the higher probability the merchant will get a sale.

Thus, there is a need in the art for a solution that enables a merchant to provide multiple financial services to its customers, that is commercially feasible to the merchant, not overly complicated from a technological perspective, and that minimizes the training required for the merchant's employees.

SUMMARY

Various embodiments of systems, methods, computer programs, and merchant devices for providing customer enrollment for a stored value card program are provided. One embodiment is a merchant device that provides stored value card services. One such merchant device comprises: an input device that receives data from a stored value card; a customer enrollment module that enrolls a customer in a stored value card program, the customer enrollment module comprising: logic configured to identify information corresponding to an account associated with the stored value card; logic configured to determine that the account corresponds to a competitor's stored value card program; and logic configured to enroll the customer in a new stored value card program.

Another embodiment is a method for implementing a stored value card program. One such method comprises: advertising a new customer enrollment program for a stored value card program; initiating an enrollment process at a merchant device; confirming that the new customer has a stored value card account with an unaffiliated stored value card program; and enrolling the new customer in the stored value card program.

Another embodiment is a method for enrolling a customer in a stored value card program. One such method comprises: generating a list of unaffiliated stored value card programs; and when enrolling a new customer in a new stored value card program at a merchant device, determining whether the new customer has a stored value account with one of the unaffiliated stored value card programs.

Yet another embodiment is a system for providing stored value card services at a merchant device. One such system comprises: means for reading data from a stored value card of a customer; means for processing the data from the stored value card and determining that the stored value card corresponds to a first stored value card program associated with a competitor of a second stored value card program affiliated with the merchant device; and means for enrolling the customer in the second stored value card program.

A further embodiment is a computer program for enrolling a new customer in a stored value card program. One such computer program comprises: logic configured to read data from a stored value card associated with a first stored value card program; logic configured to identify a first account associated with the first stored value card program; logic configured to reconcile the balance in the first account; and logic configured to credit a second account associated with a second stored value card program with an amount based on the original balance in the first account.

BRIEF DESCRIPTION OF THE DRAWINGS

Other aspects, advantages and novel features of the invention will become more apparent from the following detailed description of exemplary embodiments of the invention when considered in conjunction with the following drawings.

DETAILED DESCRIPTION

In general, the present invention can be described as a novel system, method and apparatus for a merchant to conveniently provide a variety of financial services to a consumer. The exemplary embodiments described below are for illustrative purposes only and, a person skilled in the art will construe them broadly. It should be understood that the features and aspects of the present invention can be ported into a variety of systems and system/network configurations and any examples provided within this description are for illustrative purposes only. Referring now to the figures, in which like numerals refer to like elements throughout the several views, exemplary embodiments of the present invention are described.

Figure 1:
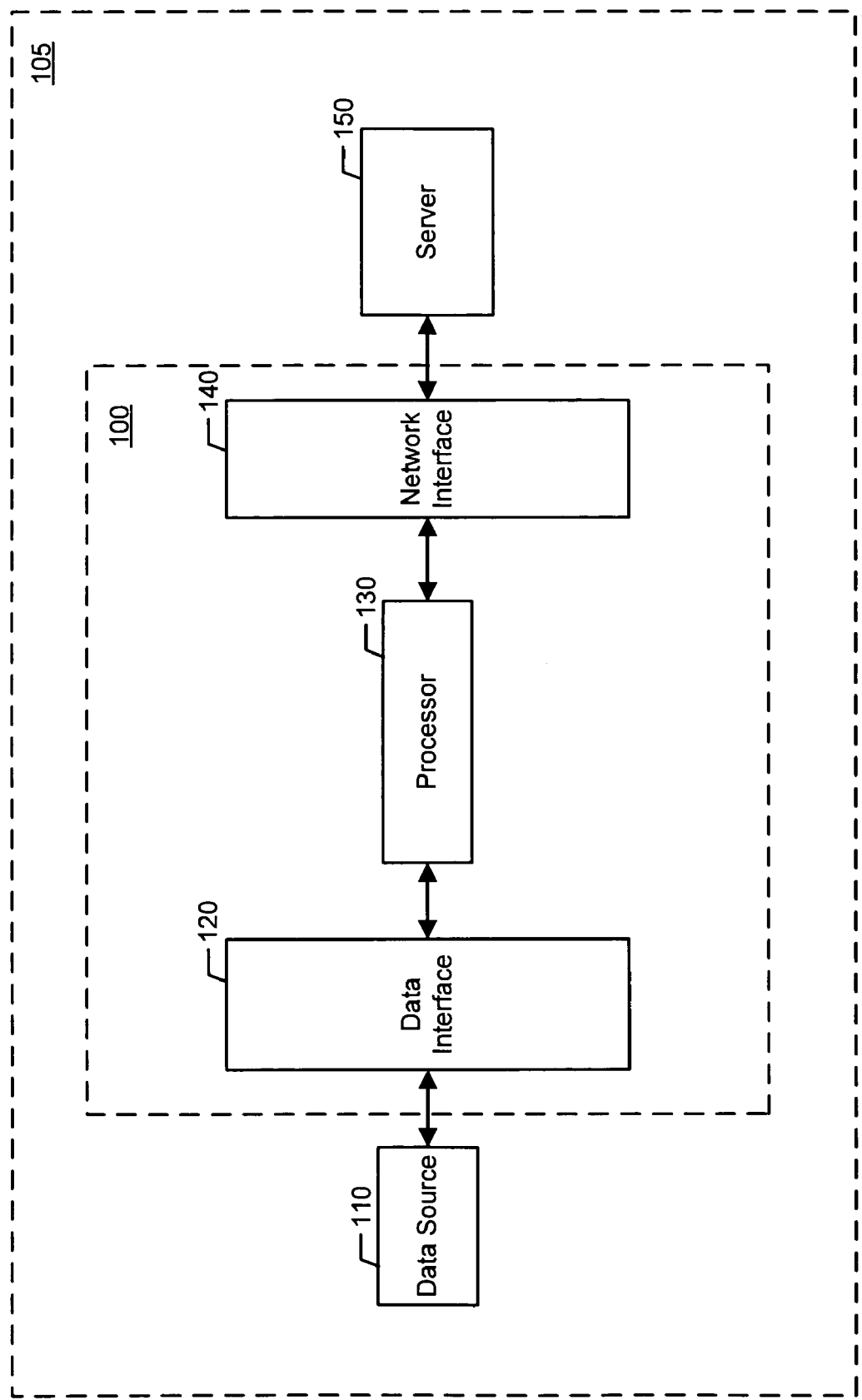
FIG. 1 is a diagram illustrating an exemplary embodiment of a device that facilitates the provision of a variety of financial services.

FIG. 1 is a diagram illustrating an exemplary embodiment of a device 100 that facilitates the provision of a variety of financial services. The device 100 is comprised of a processor 130, a data interface 120 and a network interface 140.

The data interface 120 is coupled both to the processor 130 and can interface to a data source 110. One function of the data interface 120 is to extract session data from the data source 110 and transfer the session data to the processor 130. Another function of the data interface 120 is transferring modified session data from the processor 130 to the data source 110. Thus, in some embodiments, the data interface 120 can transfer data bi-directionally. The data interface 120 may be any type of interface capable of extracting and/or writing to a data source 110. The data interface 120 may incorporate the hardware necessary to read/write to the data source 110 or may simply be an interface to a hardware device such as a bar code reader/writer, a magnetic reader/writer, a scanner, a templated scanner, a printer, a bio-metric identification device, a pass-through inlet/outlet, etc. Further, the data source 110 may consist of many different types of sources, including, but not limited to, a bar code, a magnetic-type card or magnetic storage device, scannable media, writable media, a fingerprint, a keyboard or keypad, a mouse, a light-pen, a touch pad, a display, or any other type of data device. The session data is data that may be utilized in a particular financial service transaction. The session data may be located on the data source 110, or alternatively, may be inputted manually. The session data may include, but is not limited to, name, date of birth, address, telephone number, social security number, verified government identification, direct deposit account (DDA) information and number, savings account information and number, credit history, debt to credit ratio, asset information, a type of financial service, a transaction amount, card account number, etc.

The network interface 140 is coupled to the processor 130 and interfaces to a server 150. One function of the network interface 140 is to provide session data to the server 150. Another function of the network interface 140 is obtaining validation from the server 150 and providing it to the processor 130. The server 150 validates all or a portion of the session data for a variety of different purposes depending on the particular financial service involved. The validation may include, but is not limited to, an approval for a financial service, a denial for a financial service, an available balance or fund verification, a credit worthiness verification, a billing address verification, etc.

The processor 130 is coupled to both the data interface 120 and the network interface 140. One function of the processor 130 is processing the session data and executing or initiating the provision of a plurality of financial services. The processor 130 receives the session data from the data interface 120 and requests a validation from the server 150, based at least in part on the session data, through the network interface 140. Further, the processor 130 provides or initiates the provision of a plurality of financial services and in some embodiments, is capable of updating the session data stored on the data source 110 based at least in part on the provision of the particular financial service. The plurality of financial services may include, but are not limited to, purchasing pre-paid cards, pre-paid card acceptance, credit card acceptance, debit card acceptance, check acceptance, point of sale purchase, cash back on point of sale purchase, transfers, card-to-card activity, bill payment, loyalty acceptance, etc.

FIG. 1 also illustrates the device 100 within a system for providing financial services 105. The system 105 includes: the device 100, a server 150 and one or more data sources 110. In operation, the device 100 is provided to a merchant for use in store operation. The device 100 is interfaced to and granted access to the server 150. The interface to the server 150 can be provided in a variety of fashions including, but not limited to, DSL, T1, broadband, wireless, telephonic and satellite connectivity. The device 100 is available to merchant employees in providing the financial services to customers. Depending on the desired financial service, a customer obtains and/or presents a data source 110 to the merchant in conjunction with selecting a financial service to be provided.

Figure 2:
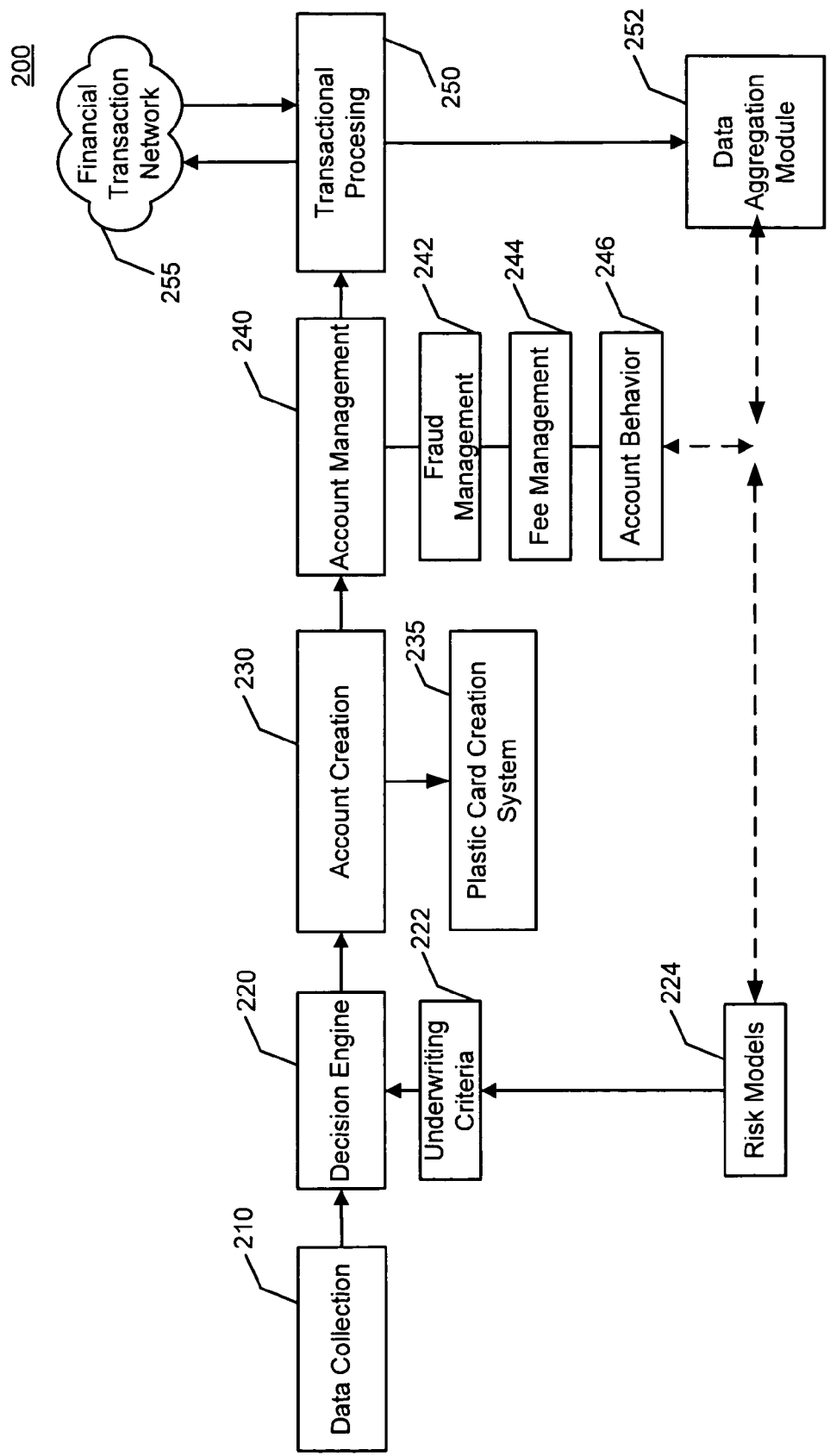
FIG. 2 is a flow diagram illustrating an overview of the steps and components that can be utilized in conjunction with implementing various embodiments of the present invention.

FIG. 2 is a flow diagram 200 illustrating an exemplary embodiment of the present invention. The details of the operation of the flow diagram 200 may vary among various embodiments of the present invention. In general, the illustrated embodiment includes five main functions or components: the data collection component 210, the decision engine 220, the account creation component 230, the account management component 240 and the transactional processing component 250. It should be understood that the structure illustrated in this figure is for discussion purposes only and the various functions or components of the present system could be combined or split in many manners.

The data collection component 210 collects data or information relevant to: opening a credit account (e.g., account formation data), determining if an applicant can qualify for an account, the type of account to be opened (e.g., account option data), and other miscellaneous data. The information collected with regards to the account formation data may include, but is not limited to, the applicant's name, date of birth, mailing, residential and business addresses, telephone numbers, social security number or verified government identification number, direct deposit account (DDA) information and account number, savings account information and account number, credit history, debt to credit ratio, assets, marital status, employment history, etc.

Further information regarding the account formation data, the account option data and the account types (as well as other types of data) can be found in the related applications identified above and which have been incorporated by reference into this specification. After the data collection component 210 receives the necessary or the minimum amount of information, the decision engine 220 can be begin processing.

The decision engine 220 receives raw or processed data from the data collection component 210 and, among other functions, integrates it with underwriting criteria 222 to determine if a customer qualifies for an account. The underwriting criteria 222 is initially determined using a collection of integrated algorithms, methods of work, business processes, and initial risk modules 224 that enable the analysis, issuance, distribution, and monitoring of an integrated credit product. The initial risk models 224 are compiled from a variety of different sources that vary by issuer. One skilled in the art is familiar with the type of information that is associated with them. In addition to determining if a customer qualifies for an account, the decision engine system 220 also determines if a customer qualifies for any applicable account option data selected in the data collection system 210. For example, if a customer selected an overdraft option in the account option data, the decision engine 220 would determine if the customer qualified for that option and, if qualified, the amount of the overdraft limit. The decision engine 220 uses the account formation data to qualify the customer and perform a risk management processes. The customer is subjected to underwriting criteria 222 to determine qualification and some additional data or documents may be required for the process. In some embodiments, the customer provides information such as personal demographic information, which can include, but is not limited to, age, social security number, driver's license number, name, address, date-of-birth, mother's maiden name, etc.

Once a customer is qualified, the account creation component 230 proceeds to open an account. The account creation component 230 may perform different functions depending upon the account option data. Preferably, the account creation component 230 operates to create an account for the customer in a manner that is in compliance with all applicable local, state and federal laws. During the account creation, the account creation component 230 may utilize various procedures to support issuer risk mitigation requirements. The account creation component 230 also includes a plastic card creation component 235 that operates to generate a permanent card for the customer.

The procedures performed by the account creation component 230 may vary depending on the type of account being created. In the examples provided in the incorporated references identified above, the three account types include the instant issue card, the basic card and the basic card with overdraft protection. Other functions that may be performed by the account creation component 230 include the activation of the account the issuance of cards. The details of these functions are more specifically described in the incorporated references.

The account management component 240 manages the customer account by utilizing controllers to enable and disable certain functions and privileges of the account based on various factors. Some of the factors can include account risks and customer behaviors. In one embodiment, the account management component 240 can include the functions of fraud management model 242, fee management model 244 and account behavior model 246. The fraud management model 242 can utilize the operation of the account behavior model 246 to determine if any fraudulent activities are associated with the account. If any fraudulent activities are detected, the account management component 240 can be notified by the fraud management model 242 to suspend the account. The fee management model 244 determines and assesses any applicable fees to be charged against the account. For example, if the account is overdue, a late fee would be assessed to the account. In the various embodiments, additional fees can be assessed against the accounts. For instance, a one time fee may be assessed for the creation of the account or for the creation of certain accounts, such as accounts having an overdraft component 234. In addition, the account may include a fixed number of transactions or a fixed number of transactions per fixed period (e.g., per month). Once the fixed number of transactions is exceeded, additional transactions can be assessed a transaction fee. In another embodiment, a monthly fee may be assessed on the account.

The account behavior model 246 examines account activity and looks for patterns in the account activity to determine possible actions to be taken (e.g., intervention to stop fraud). For example, if an account appeared to have sporadic spending or if the stored value became zero, the account could be turned off temporarily to ascertain if the account is being defrauded. The transactional processing component 250 processes and monitors the day to day transactions between the account and the financial transaction network 255. The transactional processing component 250 is then compiled by the data aggregation module 252.

The data aggregation module 252 may work on data related to the entire population of account holders, groups of populations based on factors such as age, occupation, areas of domicile etc. or even individuals. The data aggregation module 252 provides processed outputs to the risk models 224 and the account behavior 246 model.

An aspect of the present invention is found in the operation of the account management component 240. The account management component 240 of the present invention enables the dynamic management and alteration of the financial account based on real-time and current information. Two controlling factors are applied to the account management component 240. These controlling factors include the output of risk models 242 that have been run on the initial underwriting criteria collected by the data collection component 210, as well as the output of the data aggregation module 252.

The data aggregation module 252 refines and updates, preferably on a real-time basis, the various current trends of the accounts being managed. This information is then fed into the risk models 224 which determine new underwriting criteria 222, and the account behavior 246 model. The data aggregation module 252 can feed information into the risk models 224 and the account behavior 246 model at periodic intervals, continuously, autonomously, on request, or on other bases. The account behavior model 246 can operate to alter the parameters of the operation of the credit account. The account behavior model 246 can base these alterations on the input from the aggregation module 252 and/or the risk models 224. Thus, in operation, the data aggregation module 252 may identify trends for a particular subset of the population. This information in turn can be used by the risk models 224 to identify certain risks associated with the particular subset or related subsets of the population. This information, as well as the information directly provided from the data aggregation module 252 can serve as the basis for altering the parameters of the credit account. As a particular example, suppose that the data aggregation module 252 identifies an increase in transactions by customers identified as working in the airline sector and the risk models 224 indicate a decline in job stability in the transportation industry. The account behavior model 246 may utilize this information to decrease the lines of credit provided to customers working in the airline sector, increase fees associated with their accounts, provide a higher level of scrutiny on approvals of purchases, lock the account from further purchases, or the like. From a fraud perspective, the account behavior model can receive information from the data aggregation module 252 that may be an indication of fraudulent behavior. The account behavior module 246 can then take actions to limit or alleviate the risk of fraud.

Similarly, the risk models 224 can receive input from the data aggregation module 252 and/or the account behavior model 246. The information fed to the risk models 224 is used as the basis for generating new underwriting criteria for qualifying new individuals for accounts. The new underwriting criterion provides more accurate real-time criteria that are not otherwise available when using underwriting criteria that has only been created at the initial stages of qualification.

Figure 3:
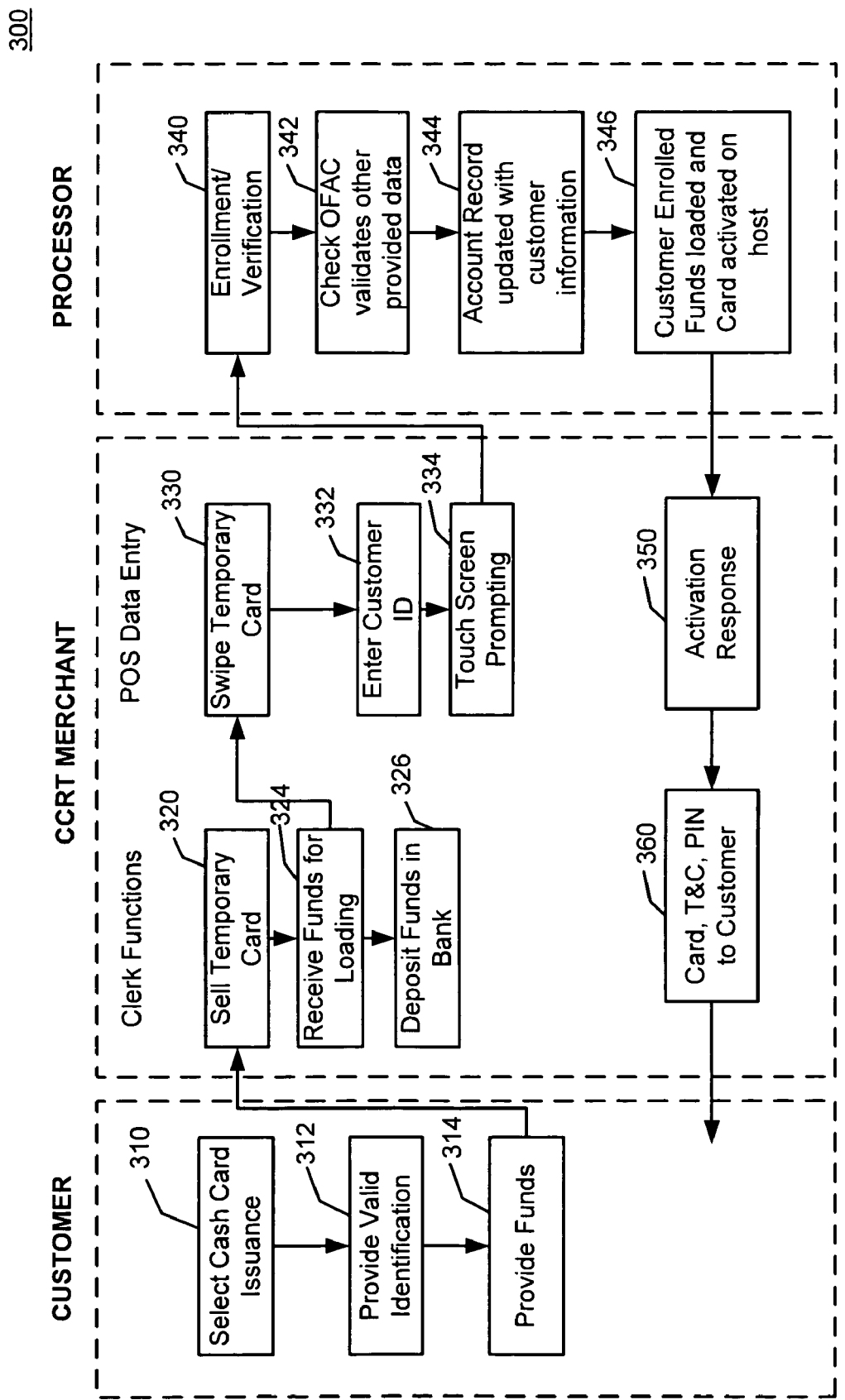
FIG. 3 is a flow diagram illustrating the processes involved in providing the exemplary financial service of issuing a cash card to a customer through the use of the device of the present invention.

FIG. 3 is a flow diagram illustrating the processes involved in providing the financial service of issuing a cash card to a customer through the use of the device 100 of the present invention 300. Initially a customer approaches a merchant that has a device. The customer selects, or with the help of the merchant, selects the financial option of the issuance of a cash card 310. The customer is then prompted to provide valid identification 312 and funding for the cash card 314.

The merchant's clerk working with the customer initiates the sell of a temporary card 320. The clerk then receives the funding from the customer that will be used for loading value into the cash card 324. Independently the merchant deposits the funds in a banking institution, transfers the funds to an appropriate account or issues a transaction against a credit card 326. In addition, the clerk swipes the temporary card through the device 330. The device 100 reads the magnetic strip on the back of the temporary card and extracts an identification number for the card. The clerk then enters the identification of the customer 332. The identification can be obtained from the valid identification presented by the customer or through some other means. The clerk then follows one or more steps prompted by the device. In the illustrated embodiment, this is done through a touch screen on the device 334.

The information collected at this point in the process is passed to a processor that first operates to enroll the customer and verify the information received from the customer 340. The processor then conducts an OFAC check and validates other data provided by the customer 342. An account record is then either created, or updated if this is a repeat customer, with the customer information 344. The processor then operates to enroll the customer, load the provided finds onto a card and activate the card in conjunction with a host or server managing the processor 346.

If the customer is approved, an activation response is provided to the device 350 and a card, terms and conditions and a PIN is provided to the customer 360. At this point the customer is then able to use the temporary card. In some embodiments, a permanent card will then be created and mailed to the customer.

Figure 4:
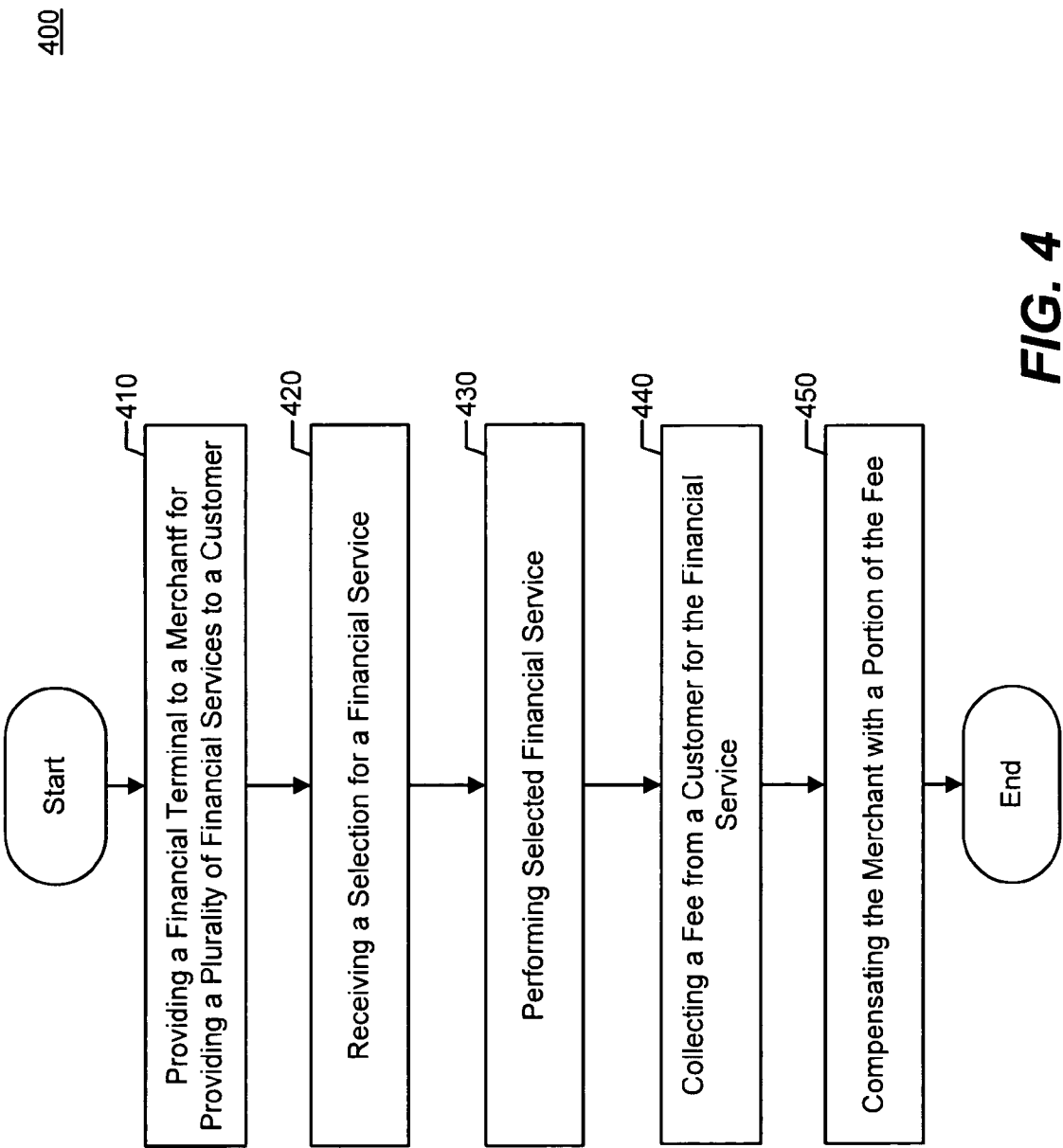
FIG. 4 is a flow diagram illustrating the operation of an exemplary embodiment of the present invention.

FIG. 4 is a flow diagram illustrating the operation of an exemplary embodiment of the present invention. One aspect of the present invention is providing an entire suite of financial services that are available to a customer, or a customer working with a merchant 400. The first step in providing the suite of financial services 400 is providing a device to a merchant 410. In conjunction with this, the device can be integrated into the merchant's communication infrastructure as well as being connected to the server 150 that operates in conjunction with the device 100. The device 100 is operable to provide the suite of financial services to a customer.

Once the device 100 or devices are installed and operational at the merchant location, the device 100 can be access by a customer and/or a merchant to initiate the provision of a financial service selected from the suite of financial services available.

One of the overall purposes of the present invention is to allow customers to have instant access to a suite of financial services at a variety of locations convenient to the customer. Thus, the service provider of the financial services equips multiple merchants with the device 100 equipment.

The suite of financial services can be accessed from the device 100 in a variety of manners. Thus, in an exemplary embodiment, a device 100 gives a service provider the ability to identify and process a customer requesting a financial service at a retail merchant point of sale. The device 100 operating in conjunction with the server 150 and other resources insures compliance with identification and qualification requirements established by competent authorities and/or the service provider. The merchant makes the device 100 available for use by a customer or the merchant operates the device 100 on behalf of the customer.

The financial service can include one of several financial services, such as purchasing a stored-value card, transferring of funds, wiring funds, obtaining cash in an ATM fashion, purchasing a pre-paid credit-type card, purchasing a pre-paid telecom card, stamps, etc. at the device. One aspect of the present invention is that a single device 100 can provide any and all of these financial services as well as other services.

In one embodiment a menu of services available can be displayed on a screen and selected by a customer and/or merchant. In another embodiment, the customer may swipe a card through the card reader of the device 100 and after identifying the customer or card identification, the device 100 can indicate the financial services available. In addition, it should be noted that the device 100 can operate in conjunction with the server 150 to determine the financial services available to the customer. Regardless of the method of indicating the services available or the method employed for selecting one of the suite of services, the device 100 receives a selection for a financial service 420. The selection is made from the plurality of financial services available to the customer.

The selected financial service is performed 430. This process can vary greatly depending on the selected financial service. However, in most situations, the customer is prompted to provide additional information that is entered into the device 100 in one of the various previous manners disclosed. Once the device 100 has sufficient information, the device 100 interacts with the server to determine if the financial service can be provided, if the customer qualifies and to verify the information is correct. This process may involve requesting additional information from the customer and/or the merchant. Ultimately, the financial service is provided to the customer.

A fee is collected from the customer for the provision of the financial service 440. As has been described, this fee can be collected in a variety of manners including cash, credit cards, bank transfers or the like.

An aspect of the present invention is the step of compensating the merchant with a portion of the fee collected from the customer 450. This varies from the current state of the art. Traditionally, merchants have paid a fee to have terminal equipment such as device 100 installed on their premises and/or paid a fee for certain transactions. The system implementation of the present invention utilizes various means for compensating the merchant for housing and operating the equipment at the merchant's location. In one embodiment, the merchant may simply be given a flat fee for each device 100. In another embodiment, the merchant may be paid a fee based on the number of devices 100 and the number of transactions provided using the devices 100. In yet another embodiment, the merchant may be compensated based solely on the number of transactions. In yet another embodiment, the merchant may be compensated based on a percentage value of the transactions. Those skilled in the art will appreciate that any of these compensation methods, as well as a combination of one or more of these methods maybe utilized and the present invention is not limited to any particular configuration.

The Suite of Services: The present invention can be utilized to provide a suite of financial services to a customer at a variety of merchant locations. The general descriptions of these financial services are provided below.

Stored-Value Card: For the financial service of purchasing a stored-value card, the customer purchases a pre-paid or stored-value magnetic-type card (the data source 110), from the merchant. The detailed components for this financial service were described in conjunction with FIG. 3. The overall operation of this financial service enables the merchant to initiate and issue a stored-value card. The merchant can accept payment for the card in a variety of manners including cash, credit card, money transfer, check, etc. The merchant may supply and swipe the card through a magnetic card reader (the data interface 120), interfaced to the device 100. This process allows the device 100 to capture the account number of the card. The merchant may then enter a value for the card into the device 100 through the data interface 120. As previously described, this information can be provided to the device 100 in a variety of manners including the use of a keyboard, scanner, magnetic card reader or the like. In one embodiment, the merchant may acquire certain additional information from the customer, such as the customer's name, date of birth, social security number, DDA number, etc.). The merchant may then enter this information into the data interface 120 of device 100. Although this aspect of the invention is being described as a customer and merchant performing certain tasks, it should be understood that either of the participants could perform the tasks and some of the tasks could even be automated.

Once the merchant has collected all of the information, or even during the information collection process, all or portions of the information are provided to the server 150 through the network interface 140. The server processes the information in a manner that is familiar to those skilled in the art. The incorporated references provide further information regarding this process. The merchant then waits for the device 100 to receive authorization from the server 150.

The funds for the stored-value card can be provided by the customer in a variety of manners. In one embodiment, the stored-value card may be funded directly from the customers direct deposit account (DDA), thus the limit of the pre-paid or stored value card is the amount taken from the account and placed on the card. In another embodiment, the stored-value can be funded based on a credit as authorized by the service provider, thus the limit of the card is limited by the amount of credit authorized. The stored-value card can also be funded by a direct cash transaction at the device 100. Thus, the value of the stored-value card can be selected by the customer or merchant and as long as funds are available.

The authorization of the stored-value card can be based on a number of factors, including, but not limited to, credit worthiness, credit history, credit score, balances in customer accounts, etc. Once an authorization has occurred, the card is activated and a stored value or credit limit is associated with the card. In one embodiment, the activation process may include writing information out to the data source 110, in this case the stored-value card. For instance, the value associated with the stored-value card, an expiration date, an authorized user name, PIN code, device 100 and/or merchant at which the card was activated, date of activation, or a variety of other information could be stored on the stored-value card. The customer may then make purchases from the merchant using the pre-paid or stored-value card.

In addition, once a financial service is provided, such as using the stored-value card, the device 100 can operate to update the session data after performing a financial service and sends the updated data to the data source 110. The customer can then use the device 100 to view activity data, history data or other data associated with the data source 110.

The process for issuing a stored-value card is also applicable to the purchasing a pre-paid credit-type card as well as a pre-paid telecom card.

Transferring of Funds: For the financial service of conducting a fund transfer, the customer initiates the transfer by selecting the appropriate feature from the device 100. The present invention can be used to transfer funds from one account into another account, from a stored-value card to an account, or from an account to a stored-value card. For transferring funds from one card to another, the customer can simply swipe the card through the card reader of the device 100 and select an option to transfer the balance, or a portion thereof to another card. The balance can be transferred to another card held by the customer or to another card not even owned by the customer. In this case, the customer will be required to enter a card identification number, account number and/or customer identification information into the device 100. The server 150 operates to receive the fund transfer request. If the transfer is a card to card transfer, the server 150 can communicate with the device 100 and instruct the customer to swipe the destination card or enter the necessary information to identify the destination for the transfer. If the transfer is to be made to a card not in the customer's possession, the server 150 can receive and maintain information regarding the transfer. Once the system is accessed by the destination card or a card associated with a customer or account destined to receive the transfer, the server 150 can initiate the completion of the transfer. If the finds are destined for an account, the server 150 can transfer the funds directly into the account once the appropriate information is entered. If the transfer request is to transfer funds from an account onto the card, the process is similar to that described in conjunction with the stored-value card financial service.

Wiring Funds: For the financial service of conducting a wiring fund transfer, the customer initiates the transfer by selecting the appropriate feature from the device 100. Similar to the funding options for the stored-value card, the customer can utilize the same options for funding the wiring transfer. The device 100 collects the necessary information by prompting the customer for the information. In the alternative, the server 150 can cause the device 100 to prompt for specific information. In either case or using a combination of both, the information is collected and transferred to the server. The server then actuates the wire transfer.

Cash-back: For the financial service of providing access to cash, the customer initiates the service by selecting the appropriate feature from the device 100. The funds to support cash access can be based on a credit card, money transfer, check, etc. The device 100 collects the necessary information by prompting the customer for the information. In the alternative, the server 150 can cause the device 100 to prompt for specific information. In either case or using a combination of both, the information is collected and transferred to the server. The server 150 then approves the financial service and gives in indication to the device 100. This same approach can be applied in the purchase of stamps.

Check Acceptance: The device 100 can also be used to authorize or verify payments by check. The check can be scanned at the device 100, and based on the account information, the server 150 can begin to process approval for the payment. The server 150 and or device 100 can request additional information from the customer to complete the financial service and the customer can enter that information at the device 100.

Bill Payment: The device 100 can be utilized by a customer to pay bills. In operation, the customer enters information to identify the recipient of the bill, along with the amount, source of funds for making the payment, and the like. The device 100 and/or server 150 may interact with the customer to obtain additional information. The source of funds can be any of a variety of sources, or a combination of one or more sources, including but not limited to, a stored-value card, banking account, cash, check or the like.

Loyalty awards: The present invention also anticipates providing a loyalty awards program. In one embodiment, the merchant charges a fee for the financial service, a portion of which is supplied to the service provider. In another embodiment, the device 100 automatically assesses and extracts a fee for a give financial service and apportions the fee appropriately to the merchant and/or the service provider.

As mentioned above, a device 100 may be installed at a merchant location and accessed by a customer, merchant, etc. to initiate the provision of various financial services. For example, in one embodiment device 100 provides various services for managing a stored value card account associated with a stored value card. As known in the art, a stored value card program enables customers to access a money balance using a stored value card. The money balance may be stored directly on the card or maintained in a stored valued card account maintained by the card issuer, host, etc. The stored value card may be used at ATM locations to withdraw money against the balance. The stored value card may also be used to make purchases against the balance at the point-of-sale.

Figure 5:
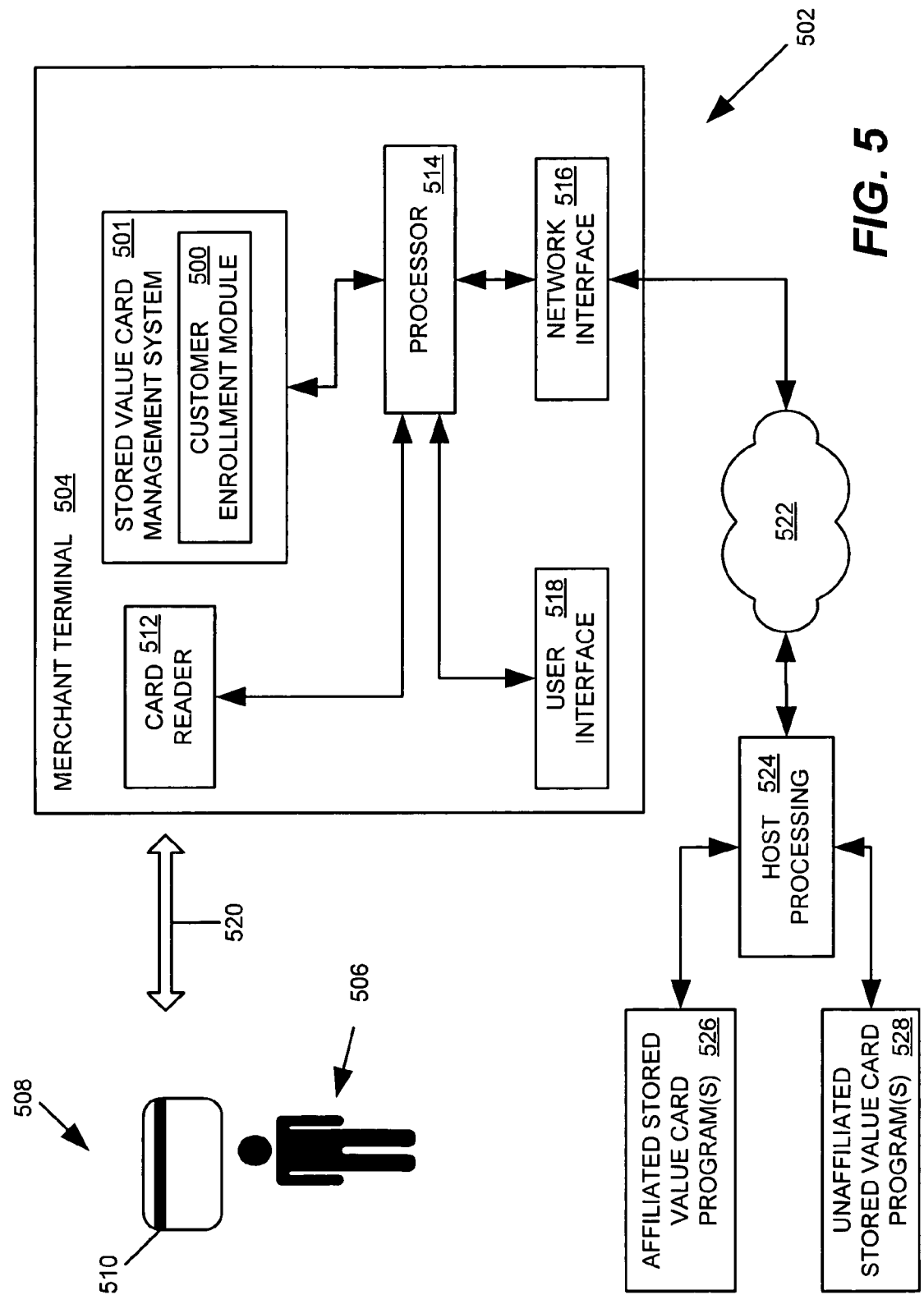
FIG. 5 is a block diagram of an embodiment of system for providing stored value card services via a merchant device.

In this regard, FIG. 5 illustrates a block diagram of a system 502 that supports the provision of various stored value card services to customer(s) 506 having a stored value card 508. As mentioned above, stored value card 508 represents money stored in a stored value card account, regardless of whether the balance is stored locally on the card or in a stored value account. As illustrated in FIG. 5, system 502 comprises one or more merchant devices 504 that provide the stored value card services to customer(s) 506. As the name suggests, merchant device 504 may be located at a merchant site where point-of-sale transactions occur. Therefore, a merchant device 504 may be associated with one or more merchant(s). Although not illustrated in FIG. 5, it should be appreciated that merchant device(s) 504 may be maintained by a merchant representative. Furthermore, it should be appreciated that the merchant representative may have access to cash via, for example, a typical cash register. In this manner, merchant device(s) 504 may be used in conjunction with—or in certain embodiments without—the merchant representative and cash register. Furthermore, in some embodiments, the merchant device 504 can include an automated teller machine (ATM) and/or computers and/or internet capable devices.

In the embodiment illustrated in FIG. 5, merchant device 504 comprises a card reader 512, a stored value card management system 501 (which includes a customer enrollment module 500), a processor 514, a user interface 518, and a network interface 516. In general, processor 514 controls the functional operation of various (although not necessarily all) aspects of card reader 512, user interface 518, network interface device 516, and stored value card management system 501. Card reader 512 comprises a hardware device configured to read stored value card 508. As illustrated in FIG. 5, stored value card 508 may comprise a magnetic strip 510 which may be read by card reader 512. It should be appreciated, however, that card reader 512 may comprise other types of input devices such as, but not limited to, keypads and the types of input devices can depend on the manner in which data is stored on stored value card 508.

User interface 518 comprises a display functionality that enables merchant device 504 to interactively communicate with consumer(s) 506. As described in more detail below, user interface 518 may provide a customer service menu by which customer(s) 506 may select various types of services, input various types of information, etc.

Network interface 516 comprises any device configured to communicate with a remote computer (e.g., issuing host) via a communications network 522. In this regard, it should be appreciated that various aspects of the services provided by merchant device 504 may be provisioned by a back-end processing functionality. The back-end processing system (e.g., host processing 524—FIG. 5) may include one or more service providers, hosts, financial institutions, etc. Therefore, it should be appreciated that the back-end processing system may include an automated clearing house component for exchanging electronic transactions among participating depository institutions. The back-end processing system may include various other components for exchanging funds between accounts, reconciling accounts, settling accounts, etc.

As further illustrated in FIG. 5, merchant device 504 includes a stored value card management system 501 which includes a customer enrollment module 500. Stored value card management system 501 may include various logical functions, software components, etc. for controlling the provision of financial services. Many of these operations, features, etc. are described above with respect to device 100. In the embodiment illustrated in FIG. 5, stored value card management system 501 includes a customer enrollment module 500 which controls functional process(es) by which customer(s) 506 are enrolled in a stored value card program.

Figure 6:
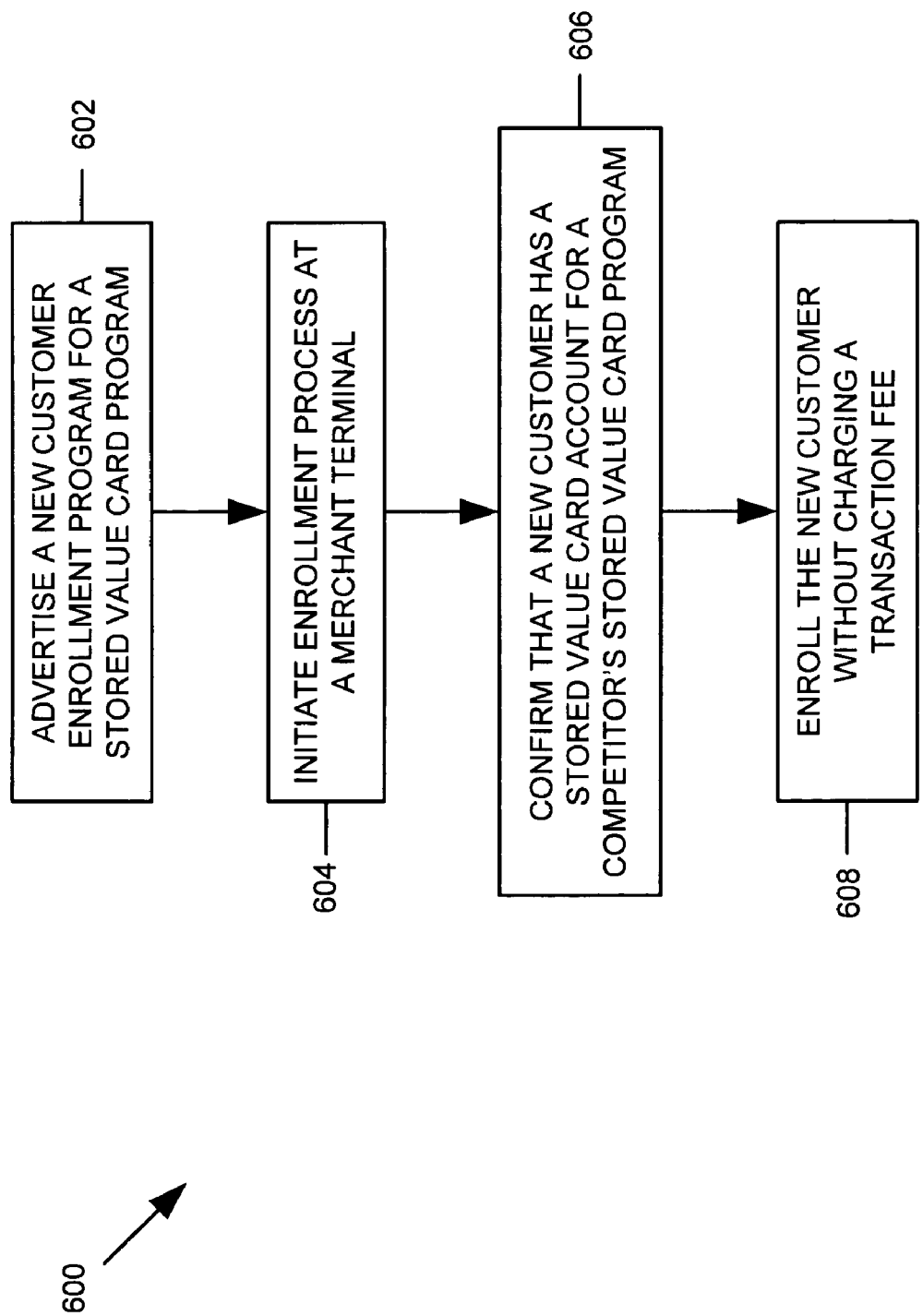
FIG. 6 is a flow chart illustrating an embodiment of a method for implementing a stored value card program.

As illustrated in FIG. 5, merchant device 504 may be affiliated with one or more stored value card programs 526. There may, however, be several other stored value card programs with which merchant device 504 is not affiliated (i.e., unaffiliated stored value card program(s) 528). One of ordinary skill in the art will appreciate that it may be advantageous to provide a marketing program for encouraging customer(s) 506 of unaffiliated stored value card programs 528 to join the affiliated programs. In this regard, FIG. 6 illustrates an embodiment of a method for implementing a stored value card program. At block 602, a new customer enrollment program for a stored value card program may be advertised. The new customer enrollment program may be specifically targeted at customer(s) 506 of the unaffiliated stored value card programs 528. For example, the new customer enrollment program may encourage customer(s) 506 of the unaffiliated stored value card programs 528 to switch to one of the affiliated stored value card programs 526. At block 604, a customer 506 of one of the unaffiliated stored value card programs 528 may initiate an enrollment process at merchant device 504. At block 606, merchant device 504 may confirm that customer 506 has a stored value card account with one of the unaffiliated stored value card programs 528 (e.g., competitor stored value card programs). The confirmation process may be as simple as inquiring with customer 506. However, as described below in more detail, the confirmation process may be automated. After confirming that the customer 506 is a competitor's customer or associated with an unaffiliated stored value card program 528, at block 608, the new customer 506 may be enrolled at merchant device without charging a transaction fee.

For instance, one or more of the affiliated stored value card programs may charge customers 506 a transaction fee when funds are initially loaded to the card or when funds are re-loaded to the card. Under the enrollment program described above, the new customers may be enrolled without paying these transaction fees. In other words, in exchange for enrolling in one of the affiliated stored value card programs 526, a typical transaction fee may be waived. In this manner, customer(s) 506 may be encouraged to join an affiliated stored value card program 526 and, thereby, increase market share.

It should be appreciated that the enrollment program may be offered with a number of alternative incentive mechanisms. Furthermore, the transaction fee need not be waived. Rather, an aspect of the enrollment program is that competitor's customers 506 are identified and enrolled in an affiliated stored value card program 526 using a different enrollment procedure than for existing customers 506. Furthermore, it should be appreciated that in some embodiments, the customer can be enrolled virtually instantaneously or in a matter of minutes.

Figure 7:
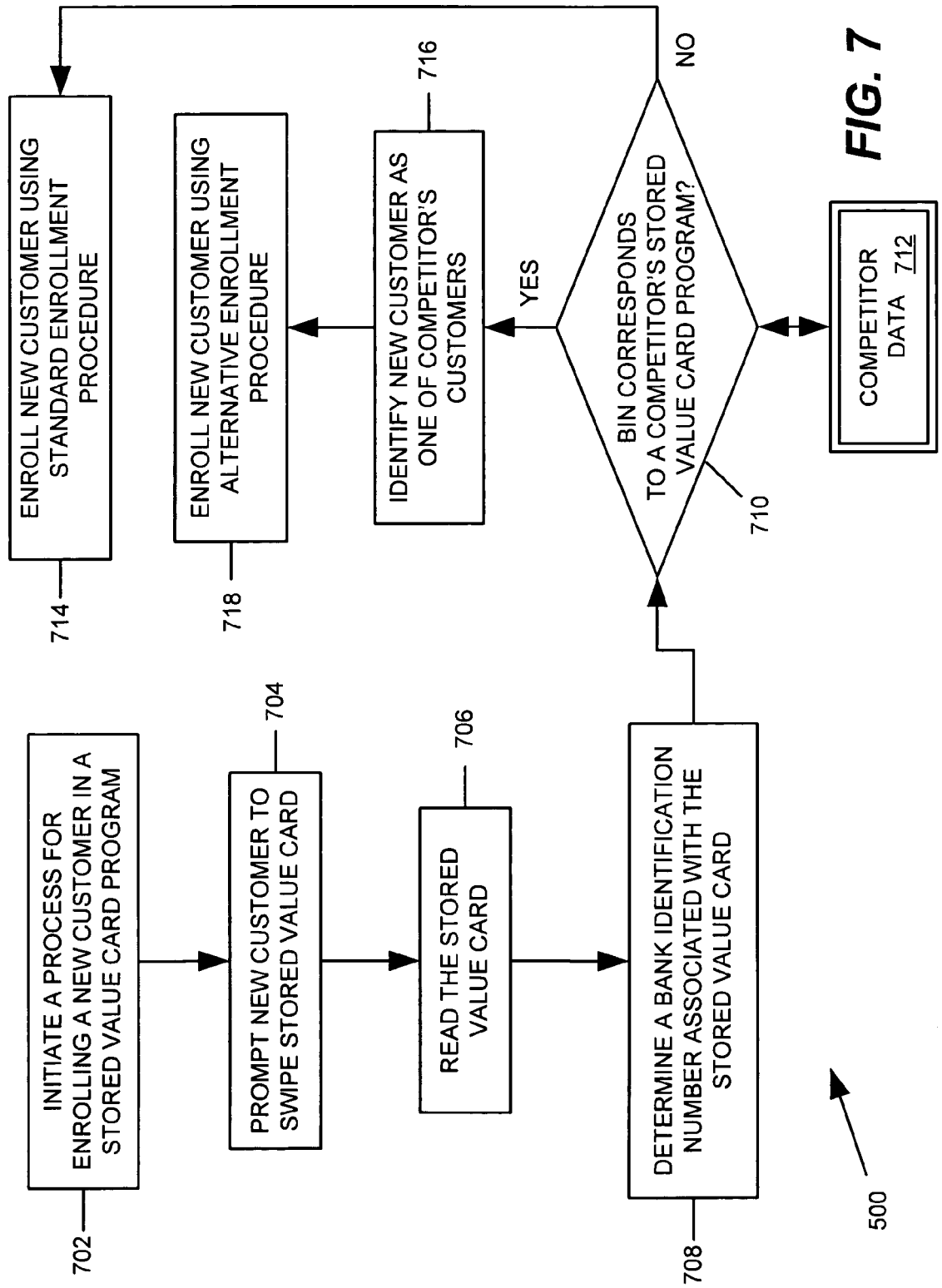
FIG. 7 is a flow chart illustrating the general architecture, operation, and/or functionality of an embodiment of the customer enrollment module of FIG. 5.

Having described the general components of system 502 and an exemplary marketing program, various embodiments of customer enrollment module 500 will be described. FIG. 7 is a flow chart illustrating the architecture, operation, and/or functionality of an embodiment of customer enrollment module 500 for enrolling competitor's customers in an affiliated stored value card program 526. At block 702, customer enrollment module 500 initiates a process for enrolling a new customer 506 in an affiliated stored value card program 526. It should be appreciated that the enrollment process may be initiated by a new customer 506 via user interface 518.

Figure 8:
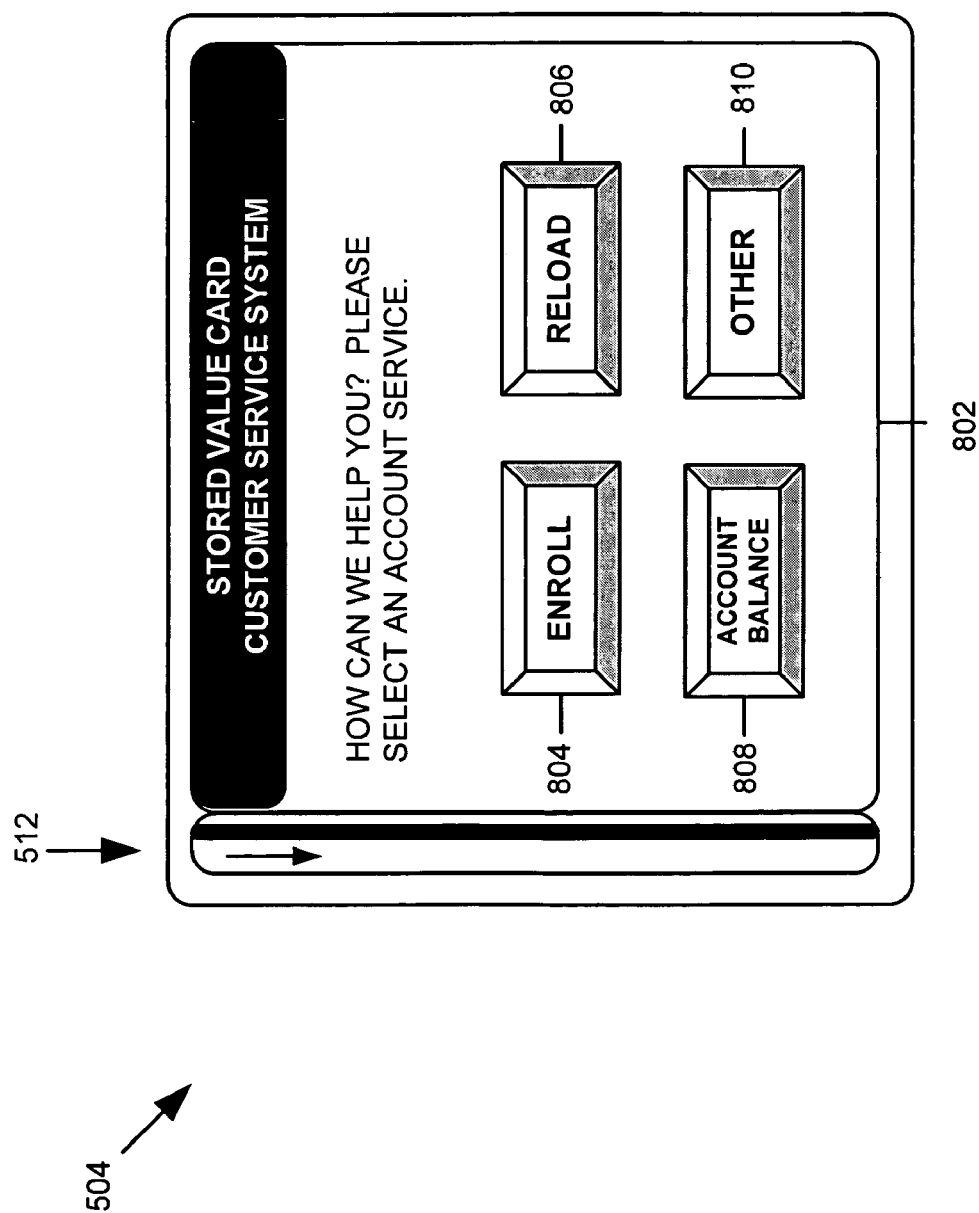
FIG. 8 is an overhead perspective view of another embodiment of a merchant device illustrating a user interface screen for selecting an account service.

As illustrated in FIG. 8-11, customer enrollment module 500 may support an interactive menu functionality that enables customers to select various services. FIG. 8 illustrates a perspective view of an embodiment of merchant device 504 which includes a display controlled by user interface 518. In FIG. 8, an enrollment screen 802 is displayed which enables a customer 506 to select one or more services via buttons displayed on the screen. For example, in the embodiment of FIG. 8, customer enrollment module 500 displays an "enroll" button 804, a "reload" button 806, an "account balance" button 808, and an "other" button 810. Reload button 806 enables customer 506 to initiate a reload process whereby stored value card 508 may be loaded with additional finds. Account balance button 808 enables customer 506 to initiate an account balance inquiry process for checking the current balance associated with stored value card 508. Customer 506 may select other button 810 to access any of a variety of other services offered by merchant device 504.

Figure 9:
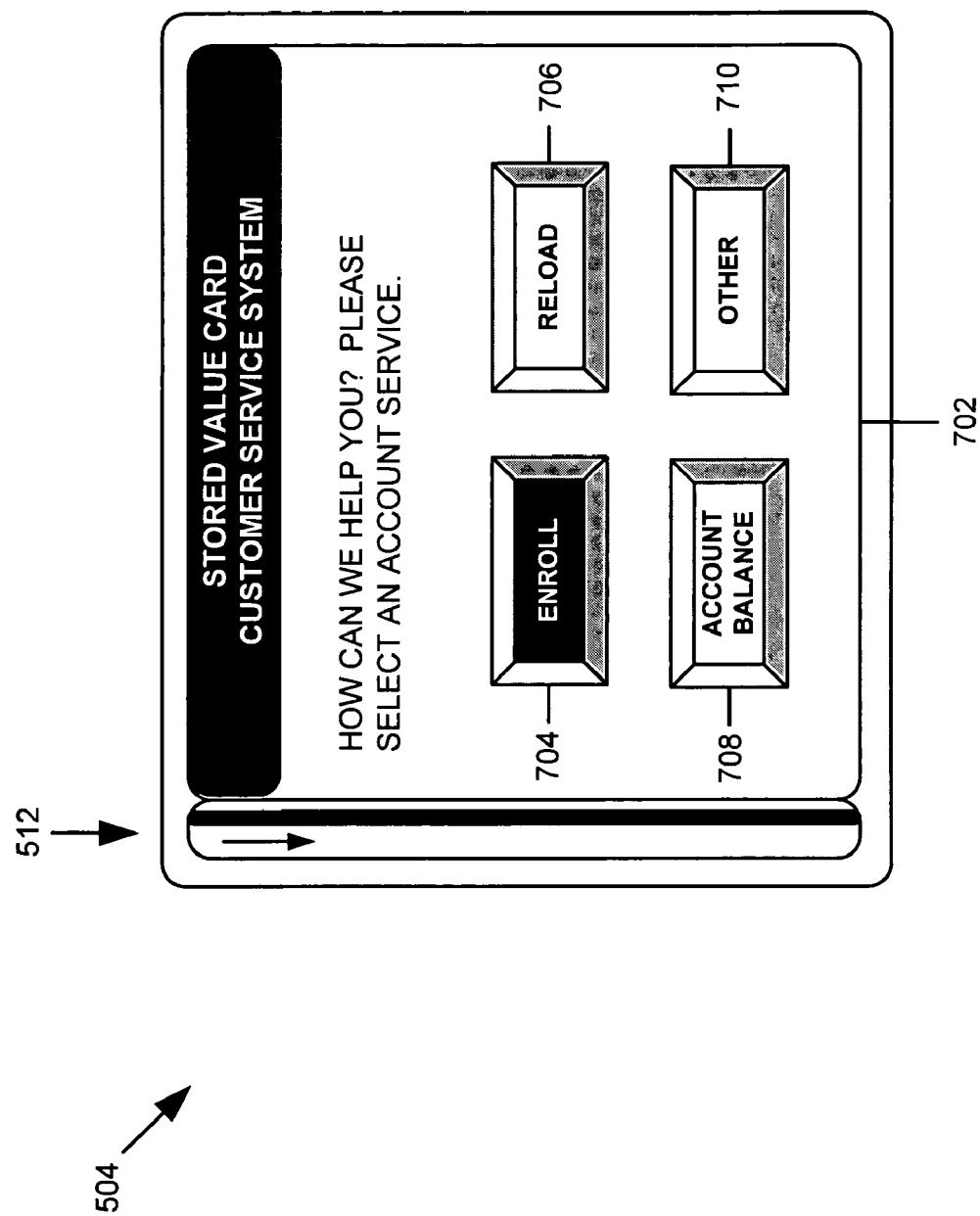
FIG. 9 illustrates the user interface screen of FIG. 7 in which the "enroll" service is selected.
Figure 10:
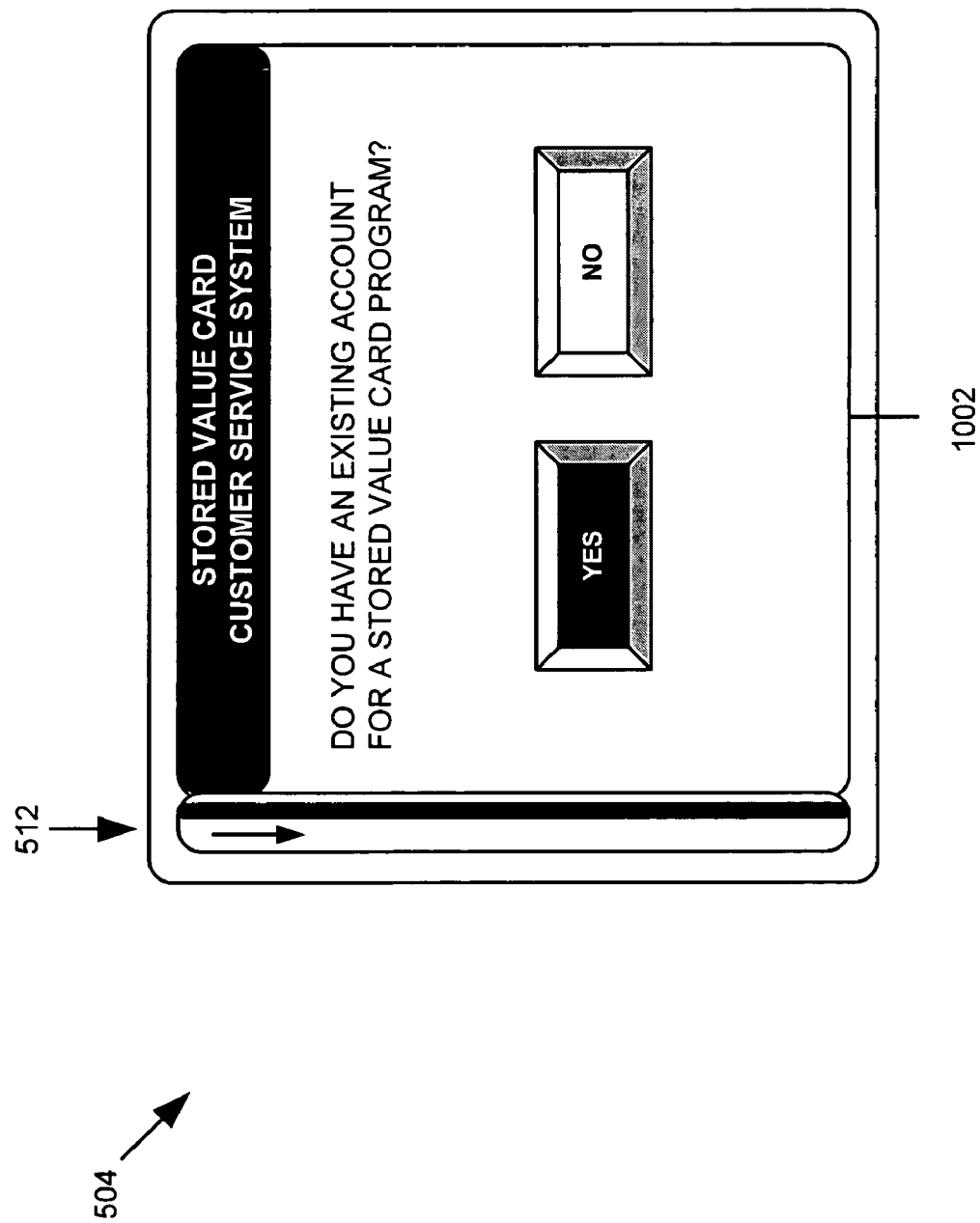
FIG. 10 is an overhead perspective view of the merchant device of FIG. 7 illustrating another user interface screen.
Figure 11:
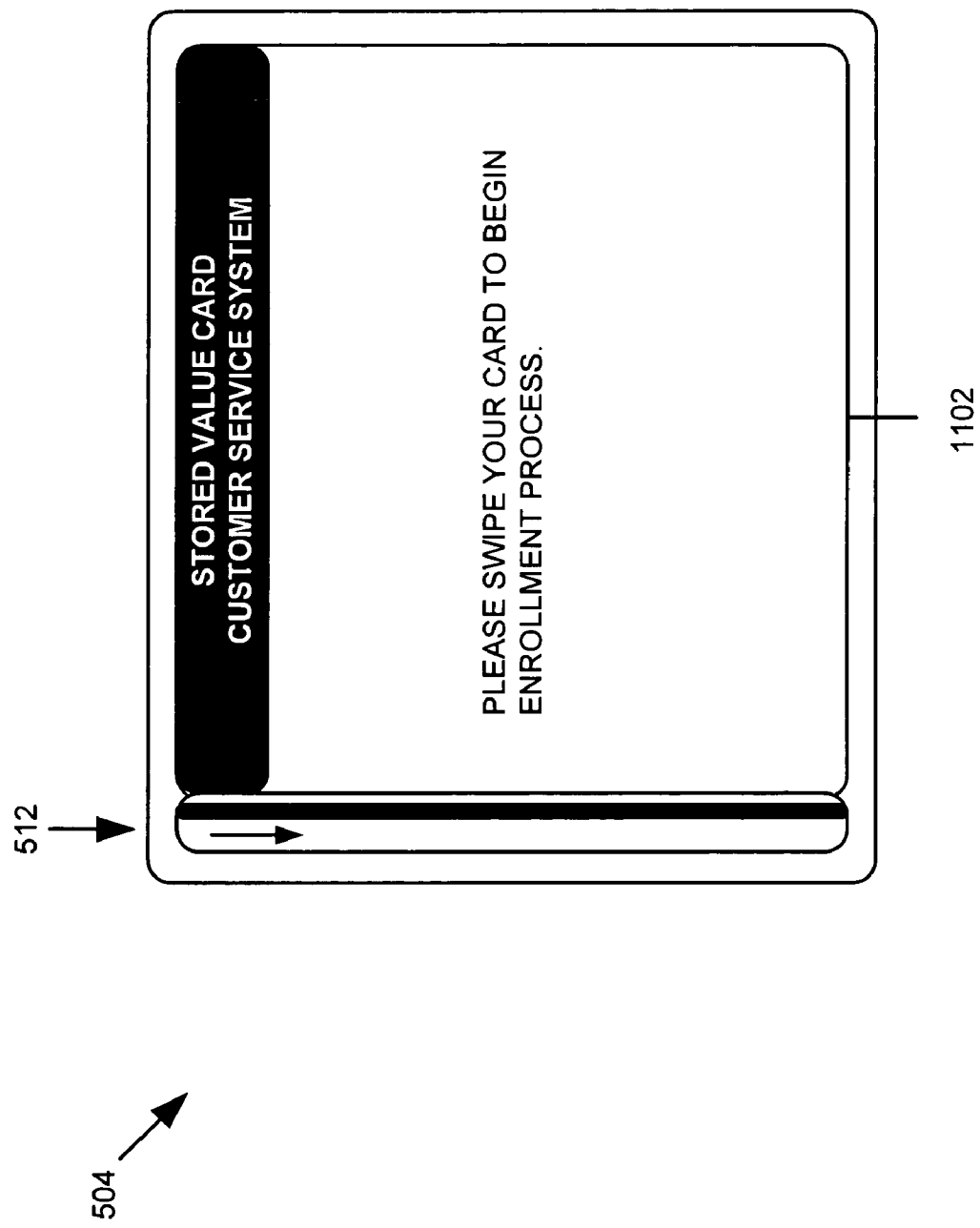
FIG. 11 is an overhead perspective view of the merchant device of FIG. 7 illustrating yet another user interface screen by which a customer is prompted to swipe a stored value card.

As illustrated in FIG. 9, customer 506 may initiate an enrollment process by selecting enroll button 804. FIG. 10 illustrates another screen 1002 which prompts customer 506 to specify whether he/she has an existing account for an unaffiliated stored value card program 528. Referring again to FIG. 7, at block 704, customer enrollment module 500 may prompt new customer 506 to swipe a stored value card 510. FIG. 11 illustrates an example of a screen 1102 for prompting new customer 506. As further illustrated in FIG. 11 and mentioned above, merchant device 504 comprises a card reader 512 for reading data from stored value card 510. In the embodiment illustrated in FIG. 11, card reader 512 includes a slot (indicated by the down arrow) for inserting and swiping stored value card 508. In some embodiments, the customer enrollment module 500 may also prompt the new customer for information such as personal demographic information, which can include, but is not limited to, age, social security number, driver's license number, name, address, date-of-birth, mother's maiden name, etc. The customer uses the user interface 518, which may include a keypad, to provide the information.

Referring again to the flow chart of FIG. 7 illustrating an embodiment of customer enrollment module 500, at block 706, data is read from stored value card 508. As known in the art, magnetic strip 510 (FIG. 5) may include various tracks of data containing information related to the customer and the corresponding stored value card account. For instance, stored value card 508 may include a card number, an account number, a bank identification number, etc. It should be appreciated that customer enrollment module 500 may not necessarily read all of the data from stored value card 508. For instance, customer enrollment module 500 may be configured to read only the data needed to confirm that customer 506 has a stored value account with an unaffiliated stored value card program.

Therefore, in one embodiment, customer enrollment module 500 may determine (at block 708) a bank identification number (BIN) associated with stored value card 508. As known in the art, the bank identification number may correspond to a unique identifier associated with the card issuer, stored value card program, etc. The BIN (or other information read from stored value card 508) may be used to determine whether customer 506 has an existing stored value account with a competitor or an unaffiliated stored value card program 528. As illustrated in the embodiment of FIG. 7, customer enrollment module 500 may determine, at block 710, whether the BIN corresponds to an unaffiliated stored value card program 528. In this regard, merchant device 504 may include competitor data 712 which comprises information about unaffiliated stored value card programs 528. Customer enrollment module 500 may access competitor data 712 to determine whether the BIN (or other information) is listed and, thereby, identifies customer 506 as having a stored value account with one of the unaffiliated stored value card programs 528.

It should be appreciated that competitor data 712 may be created by generating a list, record, database, etc. of stored value card programs that are not affiliated with merchant device 504. Competitor data 512 may then be stored at merchant device 504 or elsewhere. For example, in an alternative embodiment, competitor data 712 may be stored at a remote location on communications network 522 (e.g., host processing 524, etc.).

If customer 506 cannot be confirmed as having an account with an unaffiliated stored value card program 528, at block 714, customer enrollment module 500 may enroll new customer 506 using a standard enrollment procedure. For example, new customer 506 may be charged a standard transaction fee. However, if customer 506 is confirmed as having an account with an unaffiliated stored value card program 528 (block 716), at block 718, customer enrollment module 500 may enroll new customer 506 using an alternative enrollment procedure. As described above, new customer 506 may be enrolled without being charged a typical transaction fee. It should be appreciated, however, that various alternative enrollment procedures may be employed. An aspect is that customers 506 of unaffiliated stored value card programs 528 may be identified by customer enrollment module 500. And, once they are identified, customer enrollment module 500 may employ various enrollment procedures which are consistent with the objectives of the particular marketing program. In this manner, merchant device 504 may be appropriately configured to complement the marketing program by offering customizable enrollment procedures for existing customers, new customers, existing customers of unaffiliated stored value card programs 528, etc.

Figure 12:
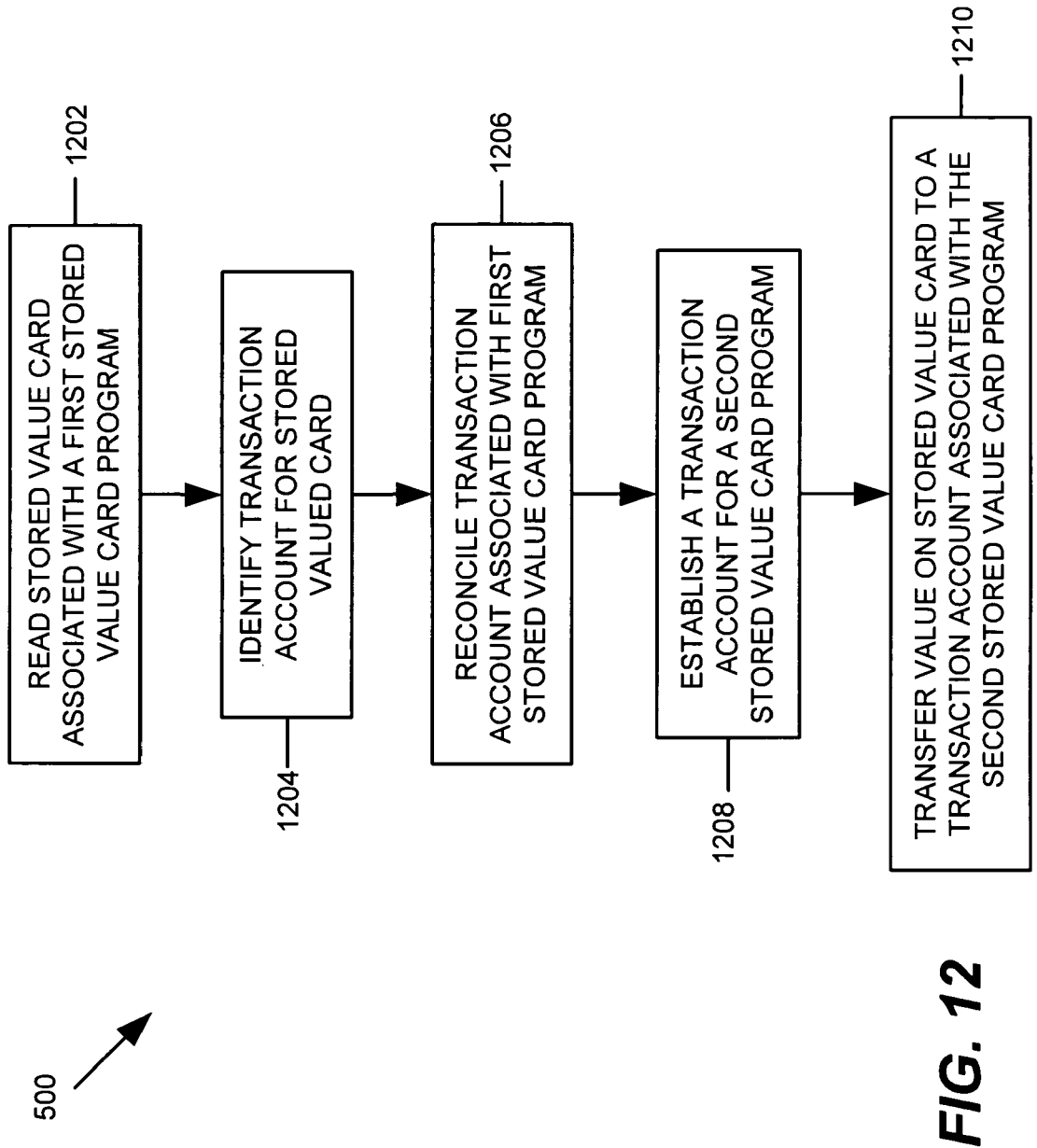
FIG. 12 is a flow chart illustrating the architecture, operation, and/or functionality of another embodiment of the customer enrollment module of FIG. 5.
Figure 13:
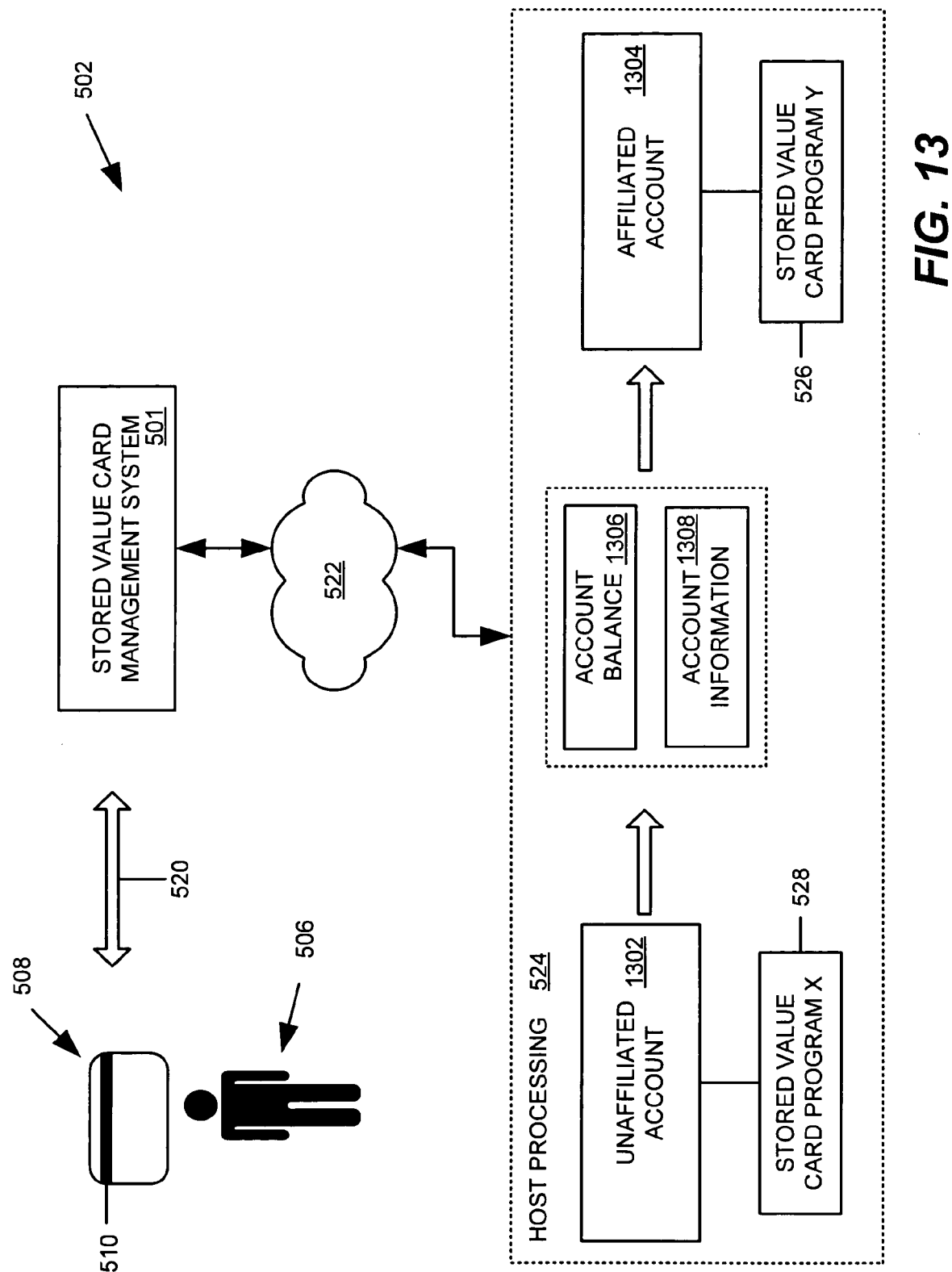
FIG. 13 is a block diagram illustrating another embodiment of a system for providing stored value card services.

With reference to FIGS. 12 and 13, an alternative embodiment of customer enrollment module 500 will be described. As mentioned above, customer enrollment module 500 may employ various enrollment procedures for customers that are identified as having a stored valued account with an unaffiliated stored value card program 528. In one embodiment, customer enrollment module 500 may be configured to facilitate the transfer of the balance on the unaffiliated card to the new stored value card. In this regard, FIG. 12 illustrates the architecture, operation, and/or functionality of an alternative embodiment of customer enrollment module 500. At block 1202, customer enrollment module 500 reads the stored value card associated with the unaffiliated stored value card program. At block 1204, customer enrollment module 500 identifies the transaction account for the unaffiliated stored value card. At block 1206, customer enrollment module 500 reconciles the transaction account for the unaffiliated stored value account.

It should be appreciated that the process of reconciling the transaction account may be performed via communications network 522 with appropriate service provider(s) (e.g., host processing 524, an automated clear house, etc.). For example, customer enrollment module 500 may initiate an electronic payment, deposit, etc. to reconcile or otherwise pay-off the balance in the transaction account for the unaffiliated stored value account. It should be appreciated that a variety of electronic payments, deposits, etc. may be employed. For instance, customer enrollment module 500 may employ a master account from which the reconciliation finds originate. Thus, customer enrollment module 500 may initiate a transfer from the master account to the transaction account for the unaffiliated stored value account. The amount of the transfer may be in the amount of the balance on the unaffiliated stored value card or, in alternative embodiments, may be less than the balance to account for any processing fees, transaction fees, etc.

Referring again to FIG. 12, at block 1208, customer enrollment module 500 may establish a second stored value account associated with the new, affiliated stored value card program. At block 1210, customer enrollment module 500 may credit the affiliated stored value account with an amount based on the previous balance on the unaffiliated stored value card. In one embodiment, the amount credited to the affiliated stored value account equals the original balance on the unaffiliated stored value account. In other words, the affiliated stored value account is established without charging any processing fees, transaction fees, etc. As mentioned above, however, the affiliated stored value account may be established in a variety of alternative ways to complement the particular marketing program being employed.

FIG. 13 is a block diagram illustrating an embodiment of an exemplary method for converting the unaffiliated stored value card to an affiliated stored value card. In the embodiment of FIG. 13, the processing occurs at the back-end processing system (e.g., host processing 524). It should be appreciated, however, that various aspects of the account management process may occur at merchant device 504 or other service provider(s) attached to communications network 522. As illustrated in FIG. 13, unaffiliated stored value card program 528 has an associated stored value account 1302 containing an account balance 1306. As part of the enrollment process, customer enrollment module 500 confirms that stored value account 1302 is associated with an unaffiliated stored value card program 528. If account 1302 is unaffiliated with merchant device 504, customer enrollment module 500 may initiate, facilitate, or otherwise control the transfer of account balance 1306 (as well as account information 1308) from unaffiliated account 1302 to a new stored value account 1304 associated with an affiliated stored value card program 526. It should be appreciated that, where there are multiple affiliated stored value card programs 526, customer enrollment module 500 may be further configured to automatically determine the appropriate stored value card program in which to enroll the new customer.

One of ordinary skill in the art will appreciate that stored value card management system 501 and customer enrollment module 500 may be implemented in software, hardware, firmware, or a combination thereof. Accordingly, in one embodiment, stored value card management system 501 and customer enrollment module 500 are implemented in software or firmware that is stored in a memory and that is executed by a suitable instruction execution system (e.g., processor 514).

In hardware embodiments, stored value card management system 501 and customer enrollment module 500 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be further appreciated that the process descriptions or functional blocks related to FIGS. 1-13 represent modules, segments, or portions of logic, code, etc. which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, stored value card management system 501 and customer enrollment module 500 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A device for providing stored value card services, the device comprising:
    an input device that reads data from a stored value card to be activated and a previously activated stored value card;
    a customer enrollment module that enrolls a customer in a stored value card program, the customer enrollment module comprising:
        logic configured to identify information corresponding to an account associated with the previously activated stored value card;
        logic configured to determine that the account corresponds to a competitor's stored value card program; and
        logic configured to enroll the customer in a new stored value card program by qualifying the customer for reception of a new stored value card, such qualifying step including performing an OFAC check, creating an account for the qualified customer, associating a temporary stored value card with the created account and receiving funding for the new stored value card by transferring the funds from the previously activated stored value card;
    wherein the logic configured to enroll the customer in a new stored value card program comprises logic configured to transfer the balance in the account associated with the previously activated stored value card to the created account corresponding to the new stored value card program.

2. The device of claim 1, wherein the logic configured to identify information corresponding to an account associated with the previously activated stored value card comprises logic configured to identify a bank identification number which is read from the previously activated stored value card.

3. The device of claim 1, wherein the logic configured to determine that the account corresponds to a competitor's stored value card program comprises logic configured to determine whether the bank identification number is included in a stored list.

4. The device of claim 1, wherein the logic configured to enroll the customer in a new stored value card program comprises logic configured to enroll the customer without charging a transaction fee.

5. The device of claim 1, wherein the logic configured to transfer the balance in the account associated with the previously activated stored value card comprises:
    logic configured to reconcile the balance in the account; and
    logic configured to credit the created account an amount based on the original balance in the account.

6. The device of claim 5, wherein the logic configured to credit the created account an amount based on the original balance in the account involves waiving an enrollment transaction fee.

* * * * *